United States Patent
Endoh et al.

(10) Patent No.: US 8,456,567 B2
(45) Date of Patent: Jun. 4, 2013

(54) IMAGING APPARATUS, IMAGING METHOD, AND COMPUTER-READABLE STORAGE MEDIUM STORING PROGRAM THEREIN

(75) Inventors: Tsuyoshi Endoh, Akiruno (JP); Yasuaki Ogawa, Tachikawa (JP); Keiichi Tanioka, Ome (JP)

(73) Assignee: Casio Computer Co., Ltd, Tokyo (JP)

( * ) Notice: Subject to any disclaimer, the term of this patent is extended or adjusted under 35 U.S.C. 154(b) by 510 days.

(21) Appl. No.: 12/761,695

(22) Filed: Apr. 16, 2010

(65) Prior Publication Data
US 2010/0271537 A1  Oct. 28, 2010

(30) Foreign Application Priority Data
Apr. 22, 2009  (JP) .................................. 2009-103715

(51) Int. Cl.
*H04N 5/232*  (2006.01)

(52) U.S. Cl.
USPC .......................................... 348/349; 348/345

(58) Field of Classification Search
None
See application file for complete search history.

(56) References Cited

U.S. PATENT DOCUMENTS

| 6,864,474 | B2 * | 3/2005 | Misawa | 250/201.4 |
| 7,657,171 | B2 * | 2/2010 | Sundstrom | 396/133 |
| 7,911,526 | B2 * | 3/2011 | Kageyama | 348/349 |
| 2008/0158409 | A1 * | 7/2008 | Gotanda | 348/348 |

FOREIGN PATENT DOCUMENTS

| JP | 2000-69345 A | 3/2000 |
| JP | 2000188713 | 7/2000 |
| JP | 2001257928 | 9/2001 |
| JP | 2004289779 | 10/2004 |
| JP | 2008301162 | 12/2008 |

OTHER PUBLICATIONS

Japanese Office Action for Japanese Patent Application No. 2009-103715 Mailed on Jan. 18, 2011.

* cited by examiner

*Primary Examiner* — Luong T Nguyen
(74) *Attorney, Agent, or Firm* — Turocy & Watson, LLP

(57) ABSTRACT

An imaging apparatus is equipped with a voltage control section, which individually controls the focus distance of a lens managed on the basis of each of a plurality of pieces of management information in accordance with a predetermined control condition corresponding to each of the pieces of management information and switches the focus distance of the lens at the time of imaging at a predetermined switching period in accordance with the focus distance indicated by each piece of management information while switching the plurality of pieces of management information at the predetermined switching period.

12 Claims, 8 Drawing Sheets

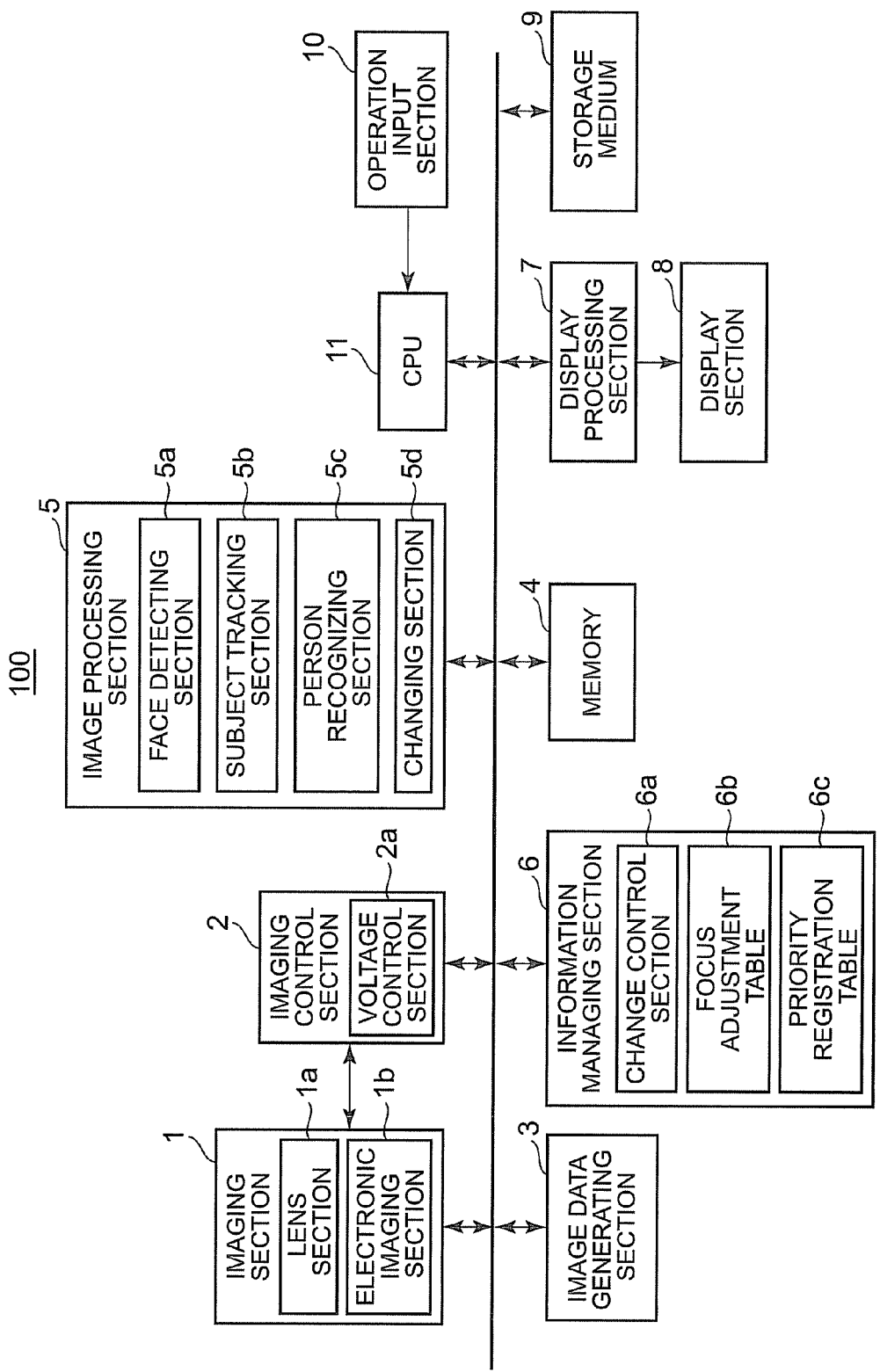

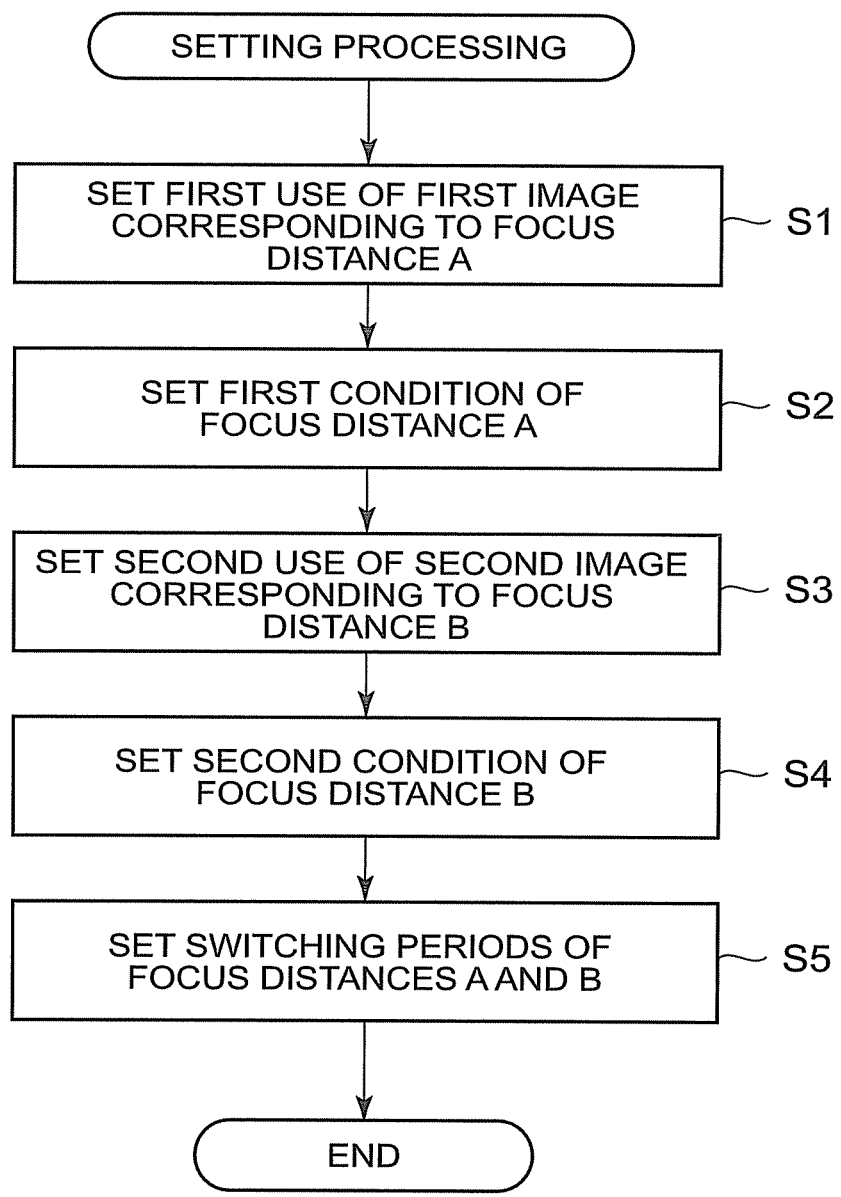

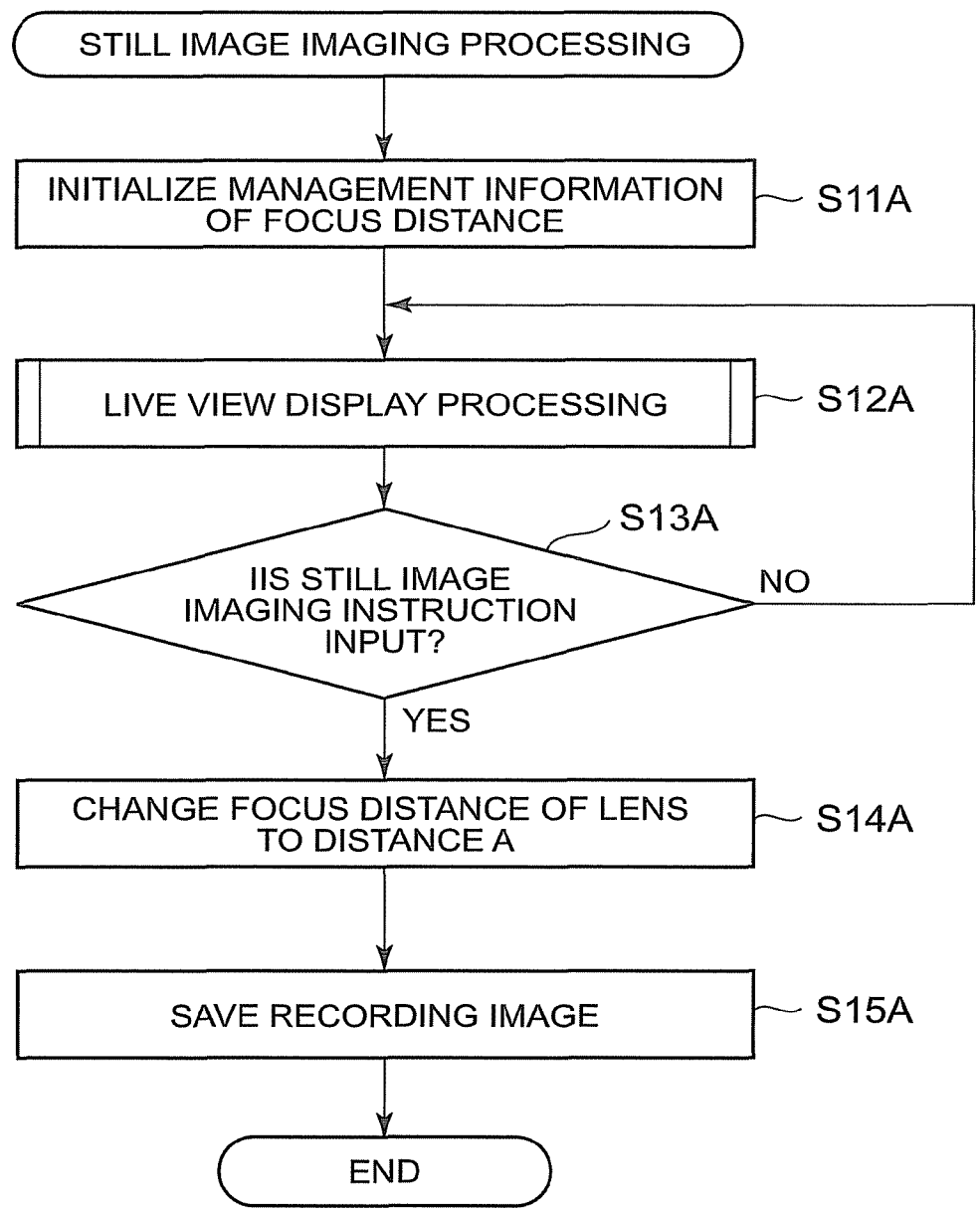

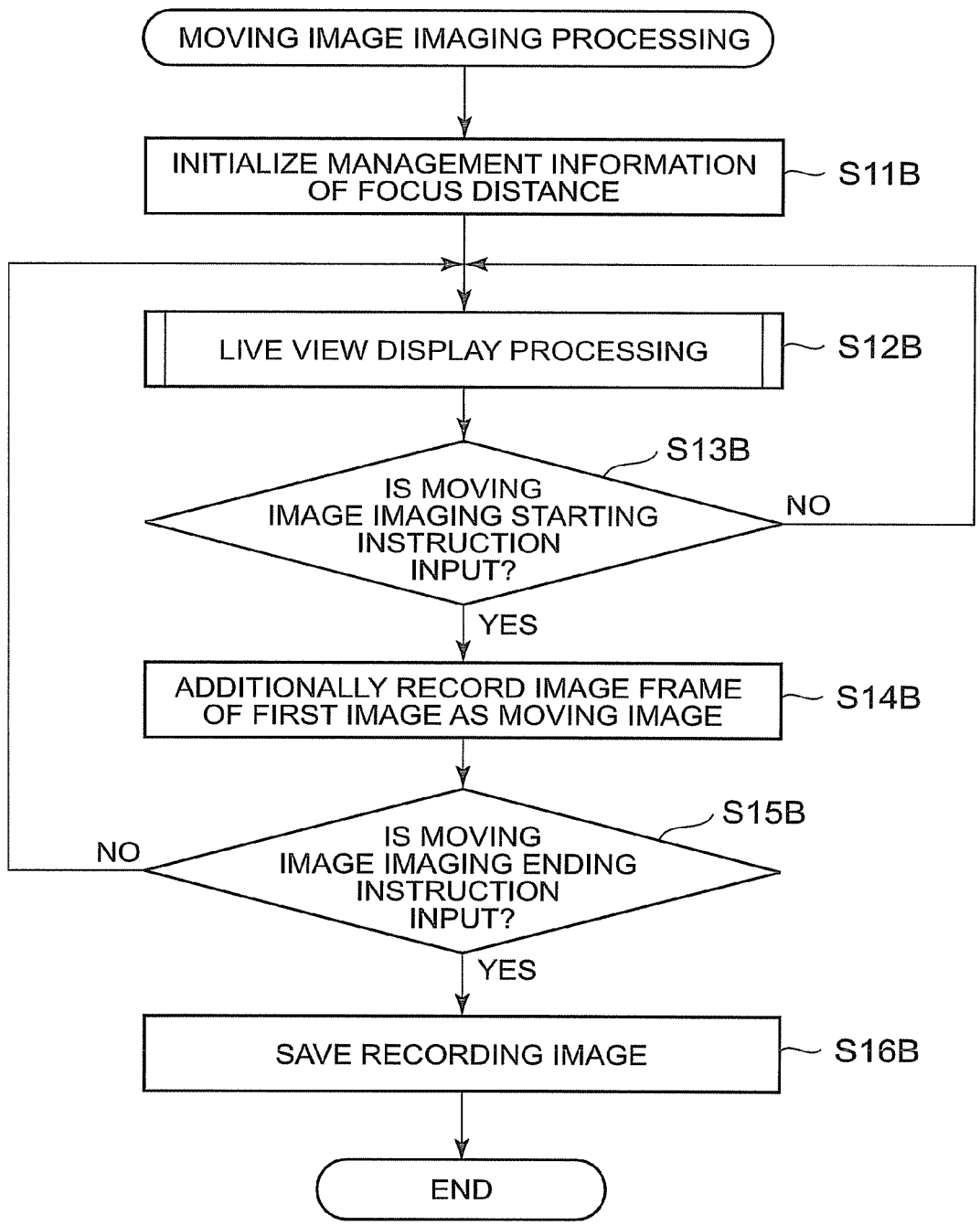

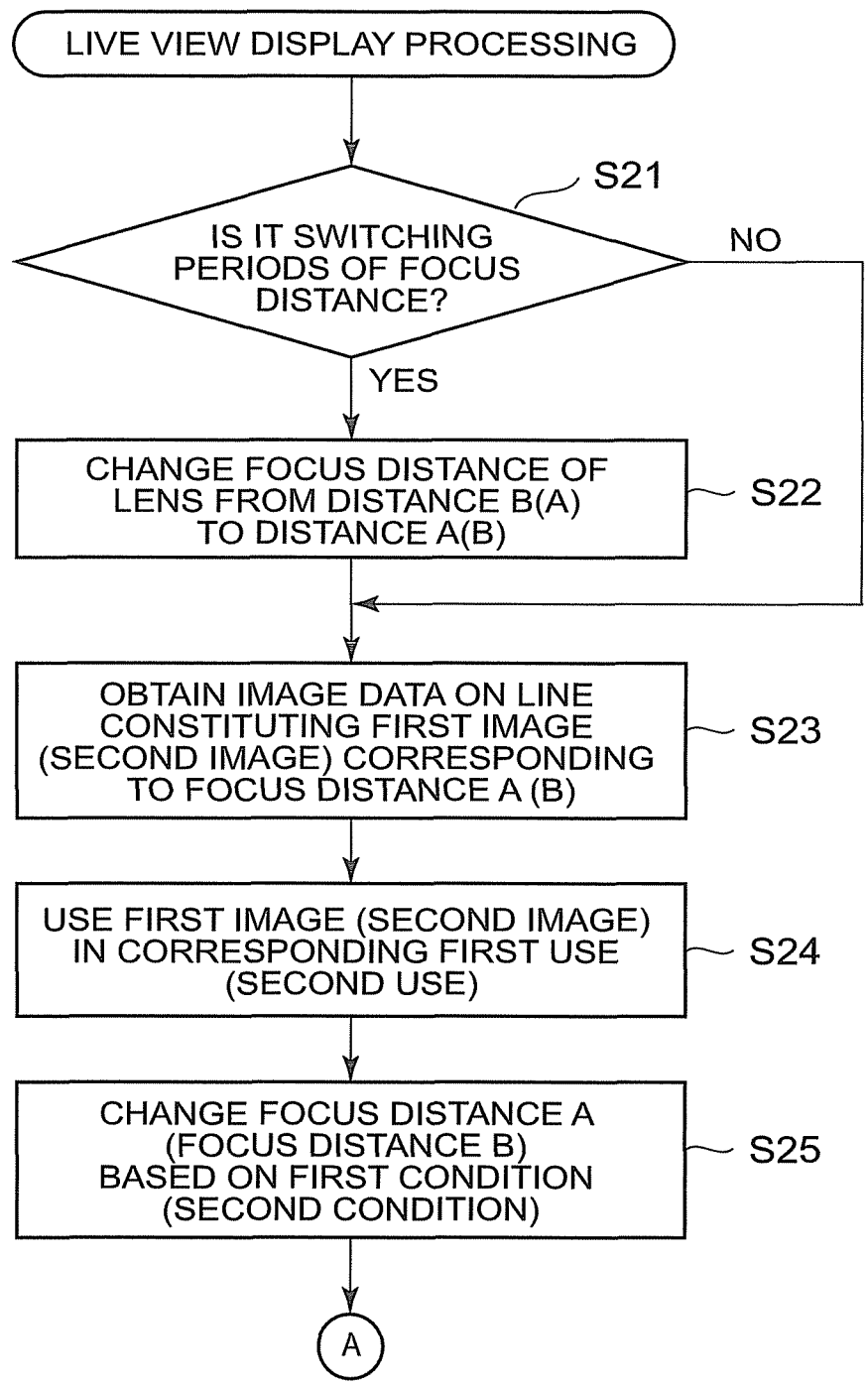

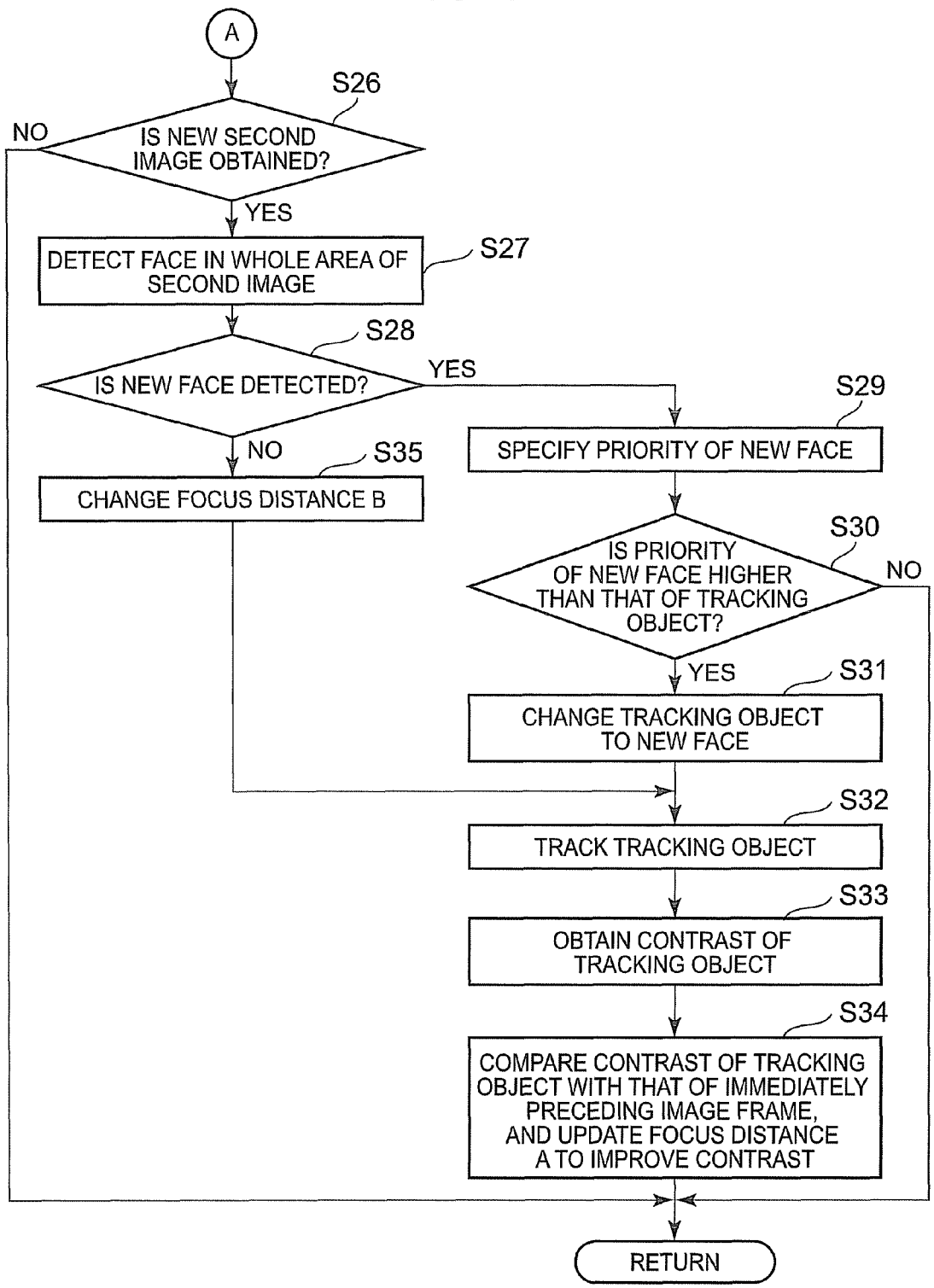

IMAGING APPARATUS, IMAGING METHOD, AND COMPUTER-READABLE STORAGE MEDIUM STORING PROGRAM THEREIN

CROSS-REFERENCE TO RELATED APPLICATIONS

This application is based on and claims the benefit of priority from the prior Japanese Patent Application No. 2009-103715, filed on Apr. 22, 2009, and including specification, claims, drawings and summary, the entire contents of which are incorporated herein by reference.

BACKGROUND OF THE INVENTION

1. Field of the Invention

The present invention relates to an imaging apparatus and an imaging method for performing image processing to a plurality of images, and a computer-readable storage medium storing a program therein for the image processing.

2. Description of the Related Art

A digital camera having a tracking type autofocus (AF) function for continuing to bring a detected subject into focus while tracking the subject after detecting the subject by means of face detection processing or the like has been known heretofore.

SUMMARY OF THE INVENTION

However, even if a subject having a priority order higher than that of a subject under tracking has moved to enter a photographing frame, the image of the new subject become out of focus to be a blurred image when the new subject is situated at a distance different from that of the subject under tracking. Consequently, the conventional digital camera has a problem that it is difficult to recognize the new subject by image processing. Even so, if the focus distance is changed so as to bring the new subject into focus, it is apprehended that the subject under tracking is lost.

Accordingly, it is an object of the present invention to provide an imaging apparatus and an imaging method which enable to continue imaging while executing the image processing for a plurality of uses, and a computer-readable storage medium storing a program therefor therein.

To achieve at least one of the aforementioned objects or other objects, in accordance with a first aspect of the present invention, an imaging apparatus, comprises:

an imaging section for changing a focus distance of a lens and performing imaging;

a managing section for storing a plurality of pieces of management information for managing the focus distance of the lens at a time of the imaging with the imaging section;

a control section for individually controlling the focus distance of the lens managed based on each of the plurality of pieces of management information in accordance with a predetermined control condition corresponding to each of the pieces of management information; and a switching section for switching the focus distance of the lens at a predetermined switching period at the time of the imaging with the imaging section in accordance with the focus distance indicated by each of the pieces of management information while switching the plurality of pieces of management information at the predetermined switching period.

Also, in accordance with a second aspect of the present invention, in an imaging method of an imaging apparatus including an imaging section for changing a focus distance of a lens and performing imaging and a managing unit for store a plurality of pieces of management information to manage the focus distance of the lens at a time of the imaging with the imaging section, the method makes the imaging apparatus execute the processes of:

individually controlling the focus distance of the lens managed based on each of the plurality of pieces of management information in accordance with a predetermined control condition corresponding to each of the pieces of management information; and switching the focus distance of the lens at a time of the imaging with the imaging section at a predetermined switching period in accordance with the focus distance indicated by each of the pieces of management information while switching the plurality of pieces of management information at the predetermined switching period.

Also, in accordance with a third aspect of the present invention, in a computer-readable storage medium storing a program therein for a computer of an imaging apparatus including an imaging section for changing a focus distance of a lens and performing imaging and a managing section for storing a plurality of pieces of management information to manage the focus distance of the lens at a time of the imaging with the imaging section, the program makes the computer realize the functions of:

a control section for individually changing the focus distance of the lens managed based on each of the plurality of pieces of management information in accordance with a predetermined control condition corresponding to each of the pieces of management information; and a switching section for switching the focus distance of the lens at a time of the imaging with the imaging section at a predetermined switching period in accordance with the focus distance indicated by each of the pieces of management information while switching the plurality of pieces of management information at the predetermined switching period.

BRIEF DESCRIPTION OF THE DRAWINGS

These objects and other objects and advantages of the present invention will become more apparent upon reading of the following detailed description and the accompanying drawings in which:

FIG. 1 is a block diagram showing a schematic configuration of an imaging apparatus of an embodiment to which the present invention is applied;

FIG. 3 is a flow chart showing an example of an operation pertaining to setting processing by the imaging apparatus in FIG. 1;

FIG. 4 is a flow chart showing an example of an operation pertaining to still image imaging processing by the imaging apparatus in FIG. 1;

FIG. 5 is a flow chart showing an example of an operation pertaining to moving image imaging processing by the imaging apparatus in FIG. 1;

FIGS. 6 and 7 are flow charts showing an example of an operation pertaining to live view display processing by the imaging apparatus in FIG. 1;

DETAILED DESCRIPTION OF THE PREFERRED EMBODIMENTS

Figure 2A:
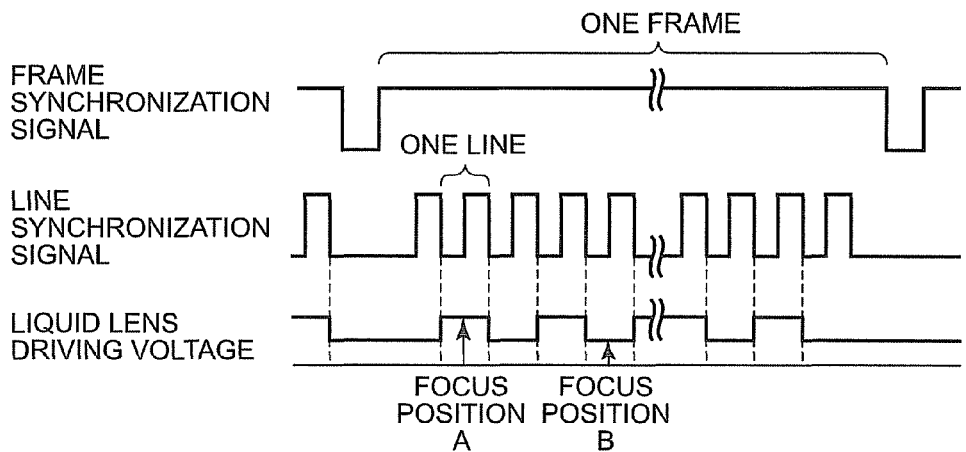
FIG. 2A is a diagram, which exemplifies to explain imaging of an image by an imaging section of the imaging apparatus in FIG. 1 and shows a relationship among a frame synchronization signal, a line synchronization signal, and a liquid lens driving voltage.

In the following, a concrete embodiment of the present invention will be described with reference to the attached drawings. However, the scope of the invention is not limited to the shown example.

FIG. 1 is a block diagram showing the schematic configuration of an imaging apparatus 100 of an embodiment to which the present invention is applied.

The imaging apparatus 100 of the present embodiment switches a plurality of focus distances of a liquid lens at a predetermined switching period at the time of performing imaging in conformity with a plurality of pieces of management information. Then, the imaging apparatus 100 controls each of the switched focus distances of the liquid lens in conformity with a predetermined control condition according to each use stored in association with the management information of each of the focus distances. Then, the imaging apparatus 100 performs the image processing of each use, stored in association with the management information of the focus distance of the liquid lens at the time of imaging each of the images, to the imaged plurality of images.

To put it concretely, as shown in FIG. 1, the imaging apparatus 100 is equipped with an imaging section 1, an imaging control section 2, an image data generating section 3, a memory 4, an image processing section 5, an information managing section 6, a display processing section 7, a display section 8, a storage medium 9, an operation input section 10, and a central processing unit (CPU) 11.

The imaging section 1 images a subject to generate an image frame. To put it concretely, the imaging section 1 is equipped with a lens section 1a and an electronic imaging section 1b.

The lens section 1a is composed of being equipped with, for example, a plurality of lenses. To put it concretely, the lens section 1a is equipped with a controllable focus lens changing the focus thereof according to an applied voltage. As the controllable focus lens, for example, a liquid lens can be given.

The liquid lens is structured to seal two kinds of liquids (for example, a predetermined aqueous solution and an oil), which do not mix with each other and severally have a refractive index different from each other, hermetically in a predetermined container. Moreover, electrodes are annexed at predetermined positions on the container. A voltage is applied to the electrodes from a voltage control section 2a (described below) of the imaging control section 2, and thereby the interface between the two kinds of liquids is bent as a lens to realize a lens function. Moreover, a change of the voltage level applied from the voltage control section 2a controls the curvature of the interface between the two kinds of liquids, and consequently changes the focus distance of the liquid lens.

That is, as the strong points of the liquid lens, the following points can be given: the lens curvature thereof changes according to an applied voltage level; the change speed of the lens curvature is high; the durability thereof is high because of having no physical movable parts; the power consumption thereof is little because no currents flow though the voltage level is high; and the like.

The electronic imaging section 1b is equipped with an image sensor, such as a complementary metal-oxide semiconductor (CMOS), to convert a subject image having passed through various lenses in the lens section 1a into a two-dimensional image signal.

The imaging control section 2 is equipped with a timing generator, a driver, and the like, although their diagrammatic representation is omitted. Then, the imaging control section 2 drives the electronic imaging section 1b by scanning the electronic imaging section 1b with the timing generator and the driver to make the electronic imaging section 1b convert an optical image into a two-dimensional image signal every predetermined period, and makes the electronic imaging section 1b read out image frames from the imaging region thereof for one screen at a time and output the read-out image frames.

Here, the imaging of an image with the CMOS image sensor of the electronic imaging section 1b is described.

The CMOS image sensor performs exposure and transfer every line in a predetermined direction (for example, horizontal direction) of an image frame unlike a charge coupled device (CCD) image sensor. That is, the CMOS image sensor sequentially performs the transfer of an image signal for one line at a time from the uppermost part of the sensor to the lower direction thereof. When the transfer of the line at the lowermost part thereof ends, the transfer of the image signal for one frame has ended. After that, the transfer is again sequentially performed from the line in the uppermost part. To put it concretely, the CMOS image sensor outputs a frame synchronization signal for synchronizing the data of each image frame, a line synchronization signal synchronizing with the output timing of the data in each line of each image frame, output data, and a clock (not shown) for the synchronization thereto to the imaging control section (see FIG. 2A).

Then, the imaging control section 2 receives the data of each line output from the electronic imaging section 1b while synchronizing with the frame synchronization signal and the line synchronization signal, and outputs the received data to the image data generating section 3.

Moreover, the imaging control section 2 is equipped with the voltage control section 2a controlling an applied voltage to the electrodes of the liquid lens.

Figure 2B:
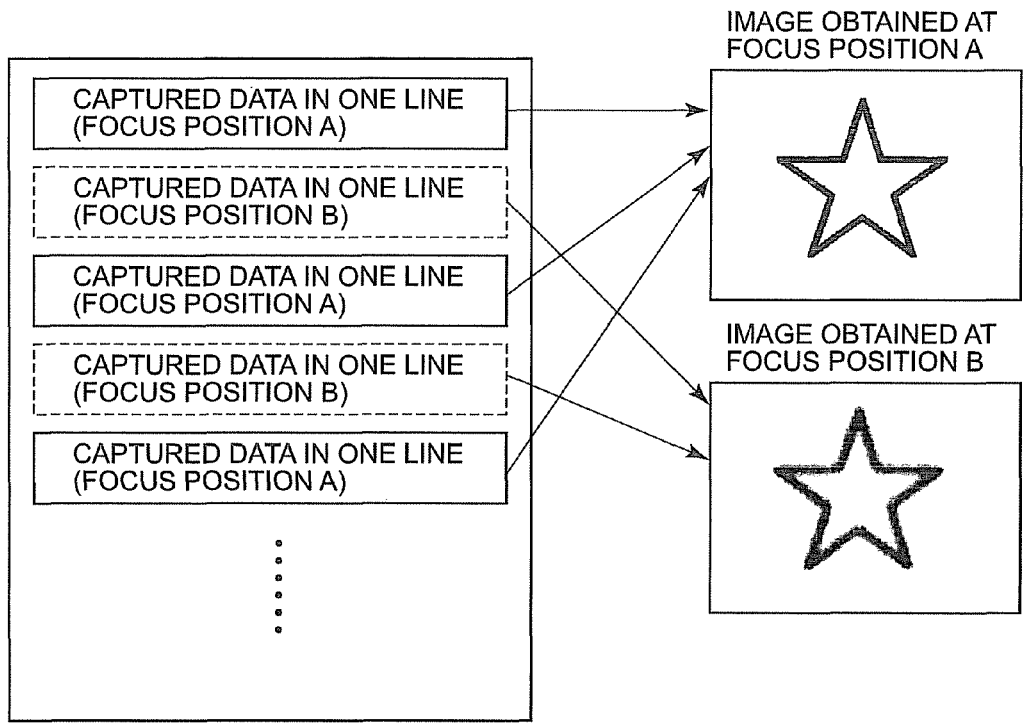
FIG. 2B is a diagram, which exemplifies to explain imaging of an image by an imaging section of the imaging apparatus in FIG. 1 and typically shows captured data in an odd line and captured data in an even line.

When the voltage control section 2a receives the line synchronization signal output from the electronic imaging section 1b, the voltage control section 2a changes a pulse width modulation (PWM) ratio according to the focus distances of first management information and second management information prescribed in a focus adjustment table 6b (described below) in synchronization with the line synchronization signal to change the drive voltage to be applied to the liquid lens. For example, as shown in FIG. 2A, the voltage control section 2a switches the drive voltage between "High" corresponding to a focus position A and "Low" corresponding to a focus position B every line. The voltage control section 2a thereby changes the curvature of the interface between the two kinds of liquids in the liquid lens to change the focus distance (focus position) of the liquid lens. As a result, the focus distances of the data output from the electronic imaging section 1b differ from each other every line. For example, as shown in FIG. 2B, the captured data in an odd line constitutes an image (for example, displaying image) obtained at the focus position A of the focus position of the liquid lens, and on the other hand, the captured data in an even line constitutes an image (for example, focus adjusting image) obtained at the focus position B of the focus position of the liquid lens.

As described above, the voltage control section 2a switches the focus distance of the lens at a predetermined switching period at the time of imaging with the imaging section 1 and the imaging control section 2 according to the focus distance indicated by each piece of management information while switching a plurality of pieces of management information at the predetermined switching period.

Moreover, the voltage control section 2a controls each of the focus distances of the liquid lens after switching in conformity with the predetermined control condition correspondingly to the use of the image processing associated with the management information prescribed in the focus adjustment table 6b (described below). To put it concretely, when the focus distance of the liquid lens is switched to a subject tracking focus distance, the voltage control section 2a controls the subject tracking focus distance so that the contrast of a tracking object may become higher on the basis of a first control condition of the first management information in the focus adjustment table 6b. Moreover, when the focus distance of the liquid lens is switched to a subject detecting focus distance, the voltage control section 2a controls the subject detecting focus distance so as to repeatedly scan the whole field from a short distance to a long distance every line of the image frame on the basis of a second control condition of the second management information in the focus adjustment table 6b.

As described above, the voltage control section 2a individually controls the focus distance of the lens managed by each of the plurality of pieces of management information in accordance with the predetermined control condition corresponding to each piece of management information.

Incidentally, although the image in focus has been exemplified as the image obtained at the focus position A and the image out of focus has been exemplified as the image obtained at the focus position B in FIG. 2B, the images at the focus positions A and B are not limited to those ones.

That is, because the focus position A of the liquid lens pertaining to the obtainment of a displaying image is fixed after bringing a subject into focus, the focus position A is always in the in-focus state while the distance of a subject does not change. But, when the distance of the subject changes, an out-of-focus state is temporarily (transiently) brought about. On the other hand, the focus position B of the liquid lens pertaining to the obtainment of the focus adjusting image is always changing in order to bring a subject changing the distance thereof into focus, the focus position B changes between the out-of-focus state and the in-focus state.

Moreover, the imaging control section 2 performs the adjustment control of various conditions, such as automatic exposure (AE) processing and automatic white balancing (AWB), at the time of imaging a subject.

The image data generating section 3 suitably performs the gain adjustment of each color component of red (R), green (G), and blue (B) of a signal, having an analog value, of the image data transferred from the electronic imaging section 1b, and after that, the image data generating section 3 performs the sample hold of the signal with a sample hold circuit (not shown) and converts the signal into digital data with an analog-to-digital (A/D) converter (not shown). Then, the image data generating section 3 performs color operation processing including pixel interpolation processing and γ correction processing of the converted digital data with a color operation circuit (not shown), and after that, the image data generating section 3 generates a luminance signal Y and chrominance difference signals Cb and Cr (YUV data) of digital values.

The luminance signal Y and the chrominance difference signals Cb and Cr output from the color operation circuit are transferred to the memory 4, used as a buffer memory, by direct memory access (DMA) transfer through a DMA controller (not shown).

The memory 4 is composed of, for example, a dynamic random-access memory (DRAM), and temporarily stores the data or the like processed by the image processing section 5, the CPU 11, and the like.

The image processing section 5 performs the image processing of each use, stored in association with the management information of the focus distance of the lens at the time of imaging each of the image frames, to the plurality of imaged image frames.

That is, the image processing section 5 is equipped with a face detecting section 5a detecting a human face from an image frame, generated by the electric imaging section 1b, by means of a predetermined face detecting method when the focus position of the liquid lens is photographed as the focus position B.

To put it concretely, the face detecting section 5a detects a face image area from the image frame photographed by the liquid lens with the focus position thereof being at the focus position B, and detects characterizing portions (face parts) corresponding to an eye, a nose, a mouth, and the like from each of the detected areas. Moreover, the face detecting section 5a performs the face detection processing detecting a new face different from the subject (face) under subject tracking processing from the image frame photographed at the focus position B.

Incidentally, because the face detection processing is a publicly known technique, the detailed description thereof is omitted here.

Moreover, the image processing section 5 is equipped with a subject tracking section 5b tracking a principal subject by the use of moving body analysis.

To put it concretely, the subject tracking section 5b performs the subject tracking processing tracking the principal subject, such as a face, in the image frame photographed with the liquid lens, the focus position of which is adjusted to the focus position A, as a tracking object between adjacent image frames. Moreover, when the tracking object is changed to the face newly detected by the face detection processing, the subject tracking section 5b performs the subject tracking processing tracking the face in the image frame photographed with the liquid lens, the focus position of which is adjusted to the focus position B, as a tracking object between the adjacent image frames.

Here, an example of the moving body analysis is minutely described.

The subject tracking section 5b first judges whether the imaging apparatus 100 is in a face detecting state thereof or a face non-detecting state thereof. When the subject tracking section 5b judges that the imaging apparatus 100 is in the face detecting state, the subject tracking section 5b obtains the face coordinates stored in the memory 4, and specifies the imaging object in the area enclosed by the face coordinates as a principal subject. On the other hand, when the subject tracking section 5b judges that the imaging apparatus 100 is in the face non-detecting state, the subject tracking section 5b specifies an imaging object in an AF area (in-focus point) according to an AF mode as a principal subject.

After that, the subject tracking section 5b scans the area within a predetermined moving body searching range near to the face coordinates into a predetermined direction in the next image frame to perform matching by the use of the image information, such as the luminance information and the color information of the principal subject, as a template, and selects the part having the highest approximation property as a principal subject.

Then, the subject tracking section 5b sets the edge part of the principal subject judged to have the highest approximation property as a tracking frame, and obtains the coordinates of each corner part of the tracking frame. After that, the subject tracking section 5b updates the face coordinates by the use of the coordinates of each of the corner parts. Furthermore, the subject tracking section 5b updates the image information, such as the luminance information and the color information, of the principal subject in the tracking frame as a template.

The subject tracking section 5b sequentially executes the processing described above to each of the plurality of image frames imaged at the focus position A, and thereby the template to be used for matching is being updated. Consequently, the subject tracking section 5b can track the principal subject as a moving body even if the subject changes with time.

Moreover, the image processing section 5 is equipped with a person recognizing section 5c recognizing an individual of a face detected by face detection processing.

The person recognizing section 5c judges whether a face detected by face detection processing is registered in a priority registration table 6c (described below) of the information managing section 6 or not. Then, when the person recognizing section 5c judges that a face is resisted as a result of the judgment, the person recognizing section 5c specifies the person registered in association with the face.

Moreover, the image processing section 5 is equipped with a changing section 5d changing a tracking object in subject tracking processing.

The changing section 5d changes a tracking object according to the priority of the individual of a face detected in face detection processing. To put it concretely, when a new face is detected in an image frame photographed at the focus position B during tracking a face in an image frame photographed at the focus position A of the focus position of the liquid lens as a principal subject, the changing section 5d judges which priority is higher between the faces on the basis of an individual recognition result of the person recognizing section 5c by referring to the priority registration table 6c of the information managing section 6. Then, when the changing section 5d judges that the priority of the individual of the new face detected in the image frame photographed at the focus position B is higher than that of the individual of the face under tracking, then the changing section 5d changes the face to the new one as the tracking object.

Moreover, when a face is detected in an image frame photographed at the focus position B during the tracking of a material body other than a face in an image frame photographed at the focus position A of the focus position of the liquid lens as a tracking object, then the changing section 5d switches the tracking object to the newly detected face.

As described above, when the priority of a new subject detected in an image photographed at the focus position B (second focus distance) is higher than that of a subject in an image photographed at the focus position A (first focus distance) during the tracking of the subject in the image photographed at the focus position A, then the changing section 5d changes the tracking object to the new subject.

The information managing section 6 is equipped with a change control section 6a changing the contents of the focus adjustment table 6b for managing the focus distance of the lens.

The focus adjustment table 6b stores a plurality of pieces of management information by associating a plurality of uses of image processing, a plurality of focus distances of the lens, and the control conditions of the focus distance with one another. For example, the focus adjustment table 6b stores a first use "subject tracking processing" of the image processing of a first image, "subject tracking focus distance" for setting the focus position of the liquid lens to the focus position A, and the first control condition "making the contrast of a tracking object higher" of the focus distance A, by associating them with one another as the first management information. Moreover, the focus adjustment table 6b stores a second use "face detection processing" of the image processing of a second image, "subject detecting focus distance" for setting the focus position of the liquid lens to the focus position B, and the second control condition "scanning the whole field from a short distance to a long distance repeatedly every line of an image frame" of the focus distance B, by associating them with one another as the second management information.

Then, when a tracking object is changed by the changing section 5d of the image processing section 5, the change control section 6a changes the content of the first management information for managing the subject tracking focus distance to the focus distance at the time of imaging a subject tracking second image. Thereby, the focus distance of the liquid lens at the time of imaging the subject tracking image (first image) is changed to the one at the time of imaging the subject detecting image (second image).

Incidentally, the focus adjustment table 6b mentioned above is an example, and the focus adjustment table 6b is not limited to the above one. That is, for example, the focus adjustment table 6b may store the first use "image displaying processing" of the image processing of the first image, "displaying focus distance" for setting the focus position of the liquid lens to the focus position A, and the first control condition "updating the focus distance so as to improve the contrast of the first image" of the focus distance A, by associating them with one another as the first management information. Moreover, the focus adjustment table 6b may store the second use "focus adjustment processing" of the image processing of the second image, "automatically focusing focus distance" for setting the focus position of the liquid lens to the focus position B, and the second control condition "changing the focus distance so as to improve the contrast of the principal subject" of the focus distance B, by associating them with one another as the second management information.

Moreover, the information managing section 6 stores the priority registration table 6c, in which the priority of each subject, such as a material body and a person, to be a tracking object in subject tracking processing is associated with each other.

Figure 8A:
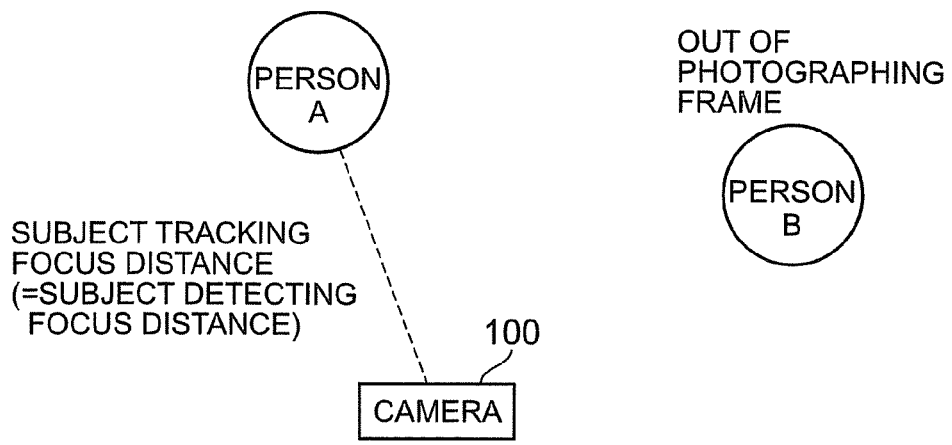
FIG. 8A is a diagram, which exemplifies to explain an example of a focus adjustment by the imaging apparatus in FIG. 1.

To put it concretely, the priority registration table 6c registers each priority in association with each individual having a face detected in face detection processing. For example, a person B is registered to have a higher priority than that of a person A (see FIGS. 8A-8C). Moreover, the priority registration table 6c registers human beings to have priorities higher than those of material bodies, as principal subjects.

As described above, the priority registration table 6c stores each priority in association with each subject to be a tracking object in subject tracking processing.

The display processing section 7 performs the control of reading out the displaying image data temporarily stored in the memory 4 to make the display section 8 display the read-out displaying image data.

To put it concretely, the display processing section 7 is equipped with a video random access memory (VRAM), a VRAM controller, a digital video encoder, and the like. Then, the digital video encoder periodically reads out the luminance signal Y and the chrominance difference signals Cb and Cr, readout from the memory 4 to be stored in the VRAM (not shown), from the VRAM through the VRAM controller under the control of the CPU 11, and generates a video signal on the basis of these pieces of data to output the generated video signal to the display section 8.

The display section 8 is, for example, a liquid crystal display apparatus, and displays an image imaged by the electronic imaging section 1b on the basis of the video signal from the display processing section 7, and the like, on the display screen thereof. To put it concretely, the display section 8 displays a live view image in a still image imaging mode and a moving image imaging mode while sequentially updating a plurality of image frames generated by the imaging of a subject with the imaging section 1 and the imaging control section 2 at a predetermined frame rate. Moreover, the display section 8 displays an image (rec view image) to be recorded as a still image, and displays an image being recorded as a moving image.

The storage medium 9 is composed of, for example, a nonvolatile memory (flash memory), and stores recording still image data, coded by a predetermined compression format with a coding section (not shown) of the image processing section 5, and moving image data composed of a plurality of image frames.

The operation input section 10 is a section for performing predetermined operations of the imaging apparatus 100. To put it concretely, the operation input section 10 is equipped with a shutter button pertaining to a subject photographing instruction, a selection determination button pertaining to a selection instruction of an imaging mode, a function and the like, a zoom button pertaining to an adjustment instruction of a zoom quantity (all not shown), and the like, and the operation input section 10 outputs predetermined operation signals according to the operations of these buttons to the CPU 11.

Moreover, the operation input section 10 outputs setting instruction signals pertaining to selection settings of a plurality of uses (for example, subject tracking processing and subject detection processing) with the image processing section 5 on the basis of user's predetermined operations to the CPU 11. When the CPU 11 receives the input of the setting instruction signals output from the operation input section 10, the CPU 11 makes the information managing section 6 set the respective uses of the image processing according to the setting instruction signals. Thereby, the user can designate the uses of desired image processing in combination, and the handier imaging apparatus 100 can be provided.

As described above, the CPU 11, the operation input section 10, and the information managing section 6 set a plurality of uses of image processing.

Moreover, the operation input section 10 outputs setting instruction signals pertaining to the selection settings of predetermined control conditions of the focus distances of the liquid lens to the CPU 11 on the basis of user's predetermined operations. When the CPU 11 receives the input of the setting instruction signals output from the operation input section 10, the CPU 11 makes the information managing section 6 set the respective predetermined control conditions of the focus distances of the liquid lens according to the setting instruction signals. Thereby, the user can designate desired conditions in combination as the control conditions of the focus distances of the liquid lens, and the handier imaging apparatus 100 can be provided.

As described above, the CPU 11, the operation input section 10, and the information managing section 6 set the predetermined control conditions of the focus distances of the liquid lens.

Moreover, the operation input section 10 outputs setting instruction signals pertaining to the settings of predetermined switching periods of the focus distances of the liquid lens to the CPU 11 on the basis of user's predetermined operations. When the CPU 11 receives the input of the setting instruction signals output from the operation input section 10, the CPU 11 makes the information managing section 6 set the predetermined switching periods of the focus distances of the liquid lens according to the setting instruction signals. To put it concretely, for example, the CPU 11 is configured to designate the predetermined switching period by selecting either of a switching period executed every image frame and a switching period executed every line constituting each image frame. Thereby, a user can designate a desired period as the switching period of each focus distance of the liquid lens, and the imaging apparatus 100 can deal with desired image qualities different in resolution, image screen flicker, and the like. Moreover, the designation of a switching period by selecting either of the one executed every image frame and the one executed every line constituting each image frame enables the preferential selection of either of the resolution and the image screen flicker in accordance with user's desire. Thereby, the handier imaging apparatus 100 can be provided.

As described above, the CPU 11, the operation input section 10, and the information managing section 6 set the predetermined switching conditions of the focus distances of the liquid lens. Moreover, the CPU 11, the operation input section 10, and the information managing section 6 designate the switching period by selecting either of the one executed every image frame and the one executed every line in a predetermined direction composed of a plurality of pixels constituting each image frame.

The CPU 11 controls each section of the imaging apparatus 100. To put it concretely, the CPU 11 performs various control operations in accordance with various processing programs (not shown) for the imaging apparatus 100.

Next, the setting processing by the imaging apparatus 100 is described with reference to FIG. 3.

FIG. 3 is a flow chart showing an example of the operation pertaining to the setting processing.

The setting processing is general processing for setting a plurality of uses of image processing prescribing the management information of the focus adjustment table 6b, the control conditions of the respective focus distances of the lens, and the switching periods of a plurality of focus distances. Moreover, the setting processing is the processing to be executed when a setting mode is selected and instructed among a plurality of imaging modes displayed on a menu screen on the basis of a predetermined operation of the selection determination button of the operation input section 10 by a user.

First, when the CPU 11 receives the input of a setting instruction signal output on the basis of a predetermined operation of the operation input section 10 by the user, the CPU 11 makes the information managing section 6 set the first use (for example, "subject tracking use" or "image displaying use") as the use of a first image to be imaged at the focus distance A (for example, "subject tracking focus distance" or "displaying focus distance") of the first management information of the focus adjustment table 6b according to the setting instruction signal (Step S1).

Next, when the CPU 11 receives the input of a setting instruction signal output on the basis of a predetermined operation of the operation input section 10 by the user, the CPU 11 makes the information managing section 6 set a first control condition (for example, "making the contrast of a tracking object higher" or "updating the focus distance so as to improve the contrast of the first image") as the control condition of the focus distance A of the first management information of the focus adjustment table 6b according to the setting instruction signal (Step S2).

Successively, when the CPU 11 receives the input of a setting instruction signal output on the basis of a predetermined operation of the operation input section 10 by the user, the CPU 11 makes the information managing section 6 set the second use (for example, "face detection processing" or "focus adjustment processing") as the use of the second image to be imaged at the focus distance B (for example, "subject detecting focus distance" or "automatically focusing focus distance") of the second management information of the focus adjustment table 6b according to the setting instruction signal (Step S3).

Next, when the CPU 11 receives the input of a setting instruction signal output on the basis of a predetermined operation of the operation input section 10 by the user, the CPU 11 makes the information managing section 6 set the second control condition (for example, "scanning the whole field from a short distance to a long distance repeatedly every line of an image frame" or "changing the focus distance so as to improve the contrast of the principal subject") as the control condition of the focus distance B of the second management information of the focus adjustment table 6b according to the setting instruction signal (Step S4).

Then, when the CPU 11 receives the input of a setting instruction signal output on the basis of a predetermined operation of the operation input section 10 by the user, the CPU 11 makes the information managing section 6 set the switching periods (for example, "switching each image frame alternately" in the subject tracking processing or the subject detection processing, and "switching an odd line and an even line alternately" in image display or focus adjustment processing) of the focus distances A and B pertaining to the first management information and the second management information, respectively, of the focus adjustment table 6b according to the setting instruction signal (Step S5).

Thereby, the setting processing is ended.

Next, still image imaging processing by the imaging apparatus 100 is described with reference to FIG. 4.

FIG. 4 is a flow chart showing an example of the operation pertaining to the still image imaging processing.

The still image imaging processing is the processing to be executed at the time when the still image imaging mode is selected and instructed among the plurality of imaging modes displayed on the menu screen on the basis of a predetermined operation of the selection determination button of the operation input section 10 by the user. Moreover, the live view display processing in the still image imaging processing will be described later with reference to FIGS. 6 and 7.

First, the CPU 11 makes the information managing section 6 initialize the variables for managing the respective focus distances of the first management information and the second management information in the focus adjustment table 6b (Step S11A). To put it concretely, the information managing section 6 sets the predetermined focus distance A as the initial value of the first management information in the focus adjustment table 6b, and sets the predetermined focus distance B as the initial value of the second management information.

Next, the CPU 11 performs live view display processing displaying a live view image on the display screen of the display section 8 on the basis of the plurality of image frames generated by the imaging of a subject with the imaging section 1 and the imaging control section 2 (see Step S12A and FIGS. 6 and 7. The details thereof will be described below).

Then, the CPU 11 judges whether a still image imaging instruction has been input or not in the live view display processing on the basis of a predetermined operation of the shutter button of the operation input section 10 by the user (Step S13A)

If the CPU 11 judges that no still image imaging instructions have been input here (Step S13A: NO), the CPU 11 moves the processing to Step S12A to repeatedly performs the live view display processing until the CPU 11 judges that the still image imaging instruction has been input at Step S13A (Step S13A: YES)

Then, if the CPU 11 judges that the still image imaging instruction is input (Step S13A: YES), then the CPU 11 makes the imaging control section 2 change the focus distance of the liquid lens to the displaying focus distance (focus distance A) on the basis of the focus adjustment table 6b (Step S14A), and makes the imaging control section 2 adjust the conditions such as exposure conditions (a shutter speed, an iris value, an amplification factor, and the like) and white balance to make the electronic imaging section 1b image the optical image of a subject under the predetermined conditions.

After that, the CPU 11 makes the image data generating section 3 generate YUV data of an image frame for storing the still image transferred from the electronic imaging section 1b, and makes the storage medium 9 save the YUV data of the image in a predetermined storage area thereof (Step S15A).

Thereby, the still image imaging processing is ended.

Next, moving image imaging processing by the imaging apparatus 100 is described with reference to FIG. 5.

FIG. 5 is a flow chart showing an example of the operation pertaining to the moving image imaging processing.

The moving image imaging processing is the processing to be executed at the time when the moving image imaging mode is selected and instructed among the plurality of imaging modes displayed on the menu screen on the basis of the predetermined operation of the selection determination button of the operation input section 10 by a user. Moreover, the live view display processing in the moving image imaging processing will be described later with reference to FIGS. 6 and 7.

First, the CPU 11 makes the information managing section 6 initialize the variables for managing the respective focus distances of the first management information and the second management information in the focus adjustment table 6b (Step S11B). To put it concretely, the information managing section 6 sets the predetermined focus distance A as the initial value of the first management information in the focus adjustment table 6b, and sets the predetermined focus distance B as the initial value of the second management information.

Next, the CPU 11 performs the live view display processing displaying a live view image on the display screen of the display section 8 on the basis of the plurality of image frames generated by the imaging of a subject with the imaging section 1 and the imaging control section 2 (see Step S12B, and FIGS. 6 and 7. The details thereof will be described below).

Then, the CPU 11 judges whether a moving image imaging starting instruction has been input or not in the live view display processing on the basis of a predetermined operation of the shutter button of the operation input section 10 by the user (Step 13B).

If the CPU 11 judges that no moving image imaging starting instructions have been input here (Step S13B: NO), the CPU 11 moves the processing to Step S12B. Then, the CPU 11 repeatedly performs the live view display processing until the CPU 11 judges that the moving image imaging starting instruction has been input at Step S13B (Step S13B: YES).

Then, if the CPU 11 judges that the moving image imaging starting instruction is input (Step S133: YES), then the CPU 11 makes the imaging control section 2 adjust the conditions such as the exposure conditions (a shutter speed, an iris value, an amplification factor, and the like) and white balance. Then, the CPU 11 makes the image data generating section 3 generate the YUV data of an image frame pertaining to a first image of a subject imaged with the electronic imaging section 1b under the predetermined conditions, and then the CPU 11 makes the memory 4 additionally record the generated YUV data as an image frame constituting the moving image (Step S14B).

Next, the CPU 11 judges whether a moving image imaging ending instruction is input on the basis of a predetermined operation of the shutter button of the operation input section 10 by the user or not (Step S15B).

If the CPU 11 judges that no moving image imaging ending instructions have been input here (Step S15B: NO), the CPU 11 moves the processing to Step S12B. Then, the CPU 11 repeatedly performs on and after the live view display processing until the CPU 11 judges that the moving image imaging ending instruction has been input at Step S15B (Step S15B: YES).

Then, if the CPU 11 judges that the moving image imaging ending instruction is input (Step S15B: YES), then the CPU 11 makes the storage medium 9 save the moving image, composed of a plurality of image frames recorded in the memory 4, into a predetermined storage area of the storage medium 9 (Step S16B).

Thereby, the moving image imaging processing is ended.

Next, the live view display processing in the still image imaging processing and the moving image imaging processing is described with reference to FIGS. 6 and 7.

FIGS. 6 and 7 are flow charts showing an example of the operation pertaining to the live view display processing.

The processing contents of the live view display processing to be executed in the still image imaging processing and those of the live view display processing to be executed in the moving image imaging processing are substantially the same, and accordingly both the processing contents are collectively described in the following.

As shown in FIG. 6, the CPU 11 first judges whether it is one of the switching periods of the focus distances A and B by referring to the focus adjustment table 6b of the information managing section 6 or not (Step S21).

If the CPU 11 judges that it is one of the switching periods of the focus distances A and B here (Step S21: YES), then the CPU 11 makes the voltage control section 2a of the imaging control section 2 change the PWM ratio in accordance with the focus distance B of the second management information (the focus distance A of the first management information) in the focus adjustment table 6b, and makes the control section 2 set the drive voltage (for example, "High") applied to the liquid lens. Then, the voltage control section 2a applies the set drive voltage to the electrodes to change the curvature of the interface between the two kinds of liquids of the liquid lens, and thereby changes the focus distance of the liquid lens from the focus distance B to the focus distance A (from the focus distance A to the focus distance B) (Step S22). Then, the subject image that has passed through the liquid lens is photoelectrically converted by the electronic imaging section 1b. When the data of the first image (second image) output from the electronic imaging section 1b is input into the image data generating section 3, the image data generating section 3 generates YUV data from the data of the first image (second image). Then, the image processing section 5 obtains the image data of the first image (second image) generated by the image data generating section 3 (Step S23).

After that, the CPU 11 makes the subject tracking section 5b (face detecting section 5a) of the image processing section 5 use the obtained first image (second image) in subject tracking processing (face detection processing) as the first use (second use) associated with the first image and the focus adjustment table 6b (Step S24).

Next, the CPU 11 makes the voltage control section 2a of the imaging control section 2 change the PWM ratio in accordance with the first control condition of the first management information (the second control condition of the second management information) in the focus adjustment table 6b to set the drive voltage (for example, "High") to be applied to the liquid lens. Then, the voltage control section 2a applies the set drive voltage to the electrodes to change the curvature of the interface between the two kinds of the liquids in the liquid lens, and thereby the voltage control section 2a changes the focus distance of the liquid lens (Step S25).

As shown in FIG. 7, the CPU 11 next judges whether the image processing section 5 has obtained a new second image newly generated by the image data generating section 3 at Step S23 or not (Step S26).

If the CPU 11 judges that the image processing section 5 has obtained the new second image here (Step S26: YES), the CPU 11 sets the detection area of a face to the whole area of the second image to make the face detecting section 5a of the image processing section 5 detect a human face with the use of a predetermined face detecting method from the whole area of the second image (Step S27).

Then, the CPU 11 judges whether any new face has been detected by the face detection processing or not (Step S28). When subject tracking processing is actually being performed with a face as a principal object, the new face means a face other than the face of the tacking object.

At Step S28, if the CPU 11 judges that a new face is detected (Step S28: YES), then the CPU 11 makes the person recognizing section 5c of the image processing section 5 judge whether the new face detected in the face detection processing is resisted in the priority registration table 6c of the information managing section 6 or not. Then, if the person recognizing section 5c judges that the face is registered as the result of the judgment thereof, then the person recognizing section 5c specifies a person registered in association with the face, and specifies the priority of the new face on the basis of the individual recognition result (Step S29).

Successively, the CPU 11 makes the changing section 5d compare the priority of the face under tracking as the principal subject in the subject tracking processing and that of the new face detected by the face detection processing with each other, and makes the changing section 5d judge whether the priority of the new face is higher than that of the face of the tracking object or not (Step S30).

If the changing section 5d judges that the priority of the new face is higher than that of the tracking object at Step S30 (Step S30: YES), then the CPU 11 makes the changing section 5d change the tracking object of the subject tracking section 5b to the new face (Step S31).

Next, the CPU 11 makes the subject tracking section 5*b* set the face in the image frame of the second image as the tracking object to perform the tracking thereof between adjacent image frames (Step S32).

Successively, the CPU 11 makes the image processing section 5 specify the maximum value and the minimum value of the luminance of a plurality of pixels constituting the image on the basis of the image data of the face part of the tracking object to calculate the difference as a contrast value of the image (Step S33). Then, the image processing section 5 compares the calculated contrast value of the tracking object and the contrast value of the tracking object in the immediately preceding image frame. Successively, the information managing section 6 adopts the focus distance of the tracking object having a better contrast value on the basis of the comparison result so as to improve the contrast to update the focus distance A of the first management information (Step S34).

Thereby, the live view display processing is ended.

On the other hand, if the CPU 11 judges that a new face is detected (Step S28: YES), then the CPU 11 makes the voltage control section 2*a* of the imaging control section 2 change the pulse width modulation (PWM) ratio in accordance with the second control condition of the second management information in the focus adjustment table 6*b* to set the drive voltage (for example, "High") to be applied to the liquid lens. Then, the voltage control section 2*a* applies the set drive voltage to the electrodes to change the curvature of the interface between the two kinds of the liquids of the liquid lens, and thus changes the focus distance of the liquid lens (Step S35). After that, the voltage control section 2*a* moves the processing to Step S32.

Moreover, if the cup 11 judges that no new second images have been obtained at Step S26 (Step S26: NO), that is, if the focus distance of the liquid lens is switched to the focus distance A at Step S21, then the CPU 11 ends the live view display processing because no new second images have been obtained.

Moreover, if the CPU 11 judges that the priority of the new face is not higher than that of the face of the tracking object at Step S30 (Step S30: NO), that is, also if the priority of the person of a new face is lower than that of the person of the face of the tracking object, although the CPU 11 has detected the new face in the face detection processing, then the CPU 11 ends the live view display processing.

In the still image imaging processing and the moving image imaging processing described above, for example, as shown in FIGS. 8A-8C, the person A is in the state of being in focus during imaging while tracking the person A as the subject in subject tracking autofocus (AF). At this time, the focus distance A (subject tracking focus distance) of the first management information and the focus distance B (subject detecting focus distance) of the second management information, both prescribed in the focus adjustment table 6*b*, are equal to each other (see FIG. 8A).

Figure 8B:
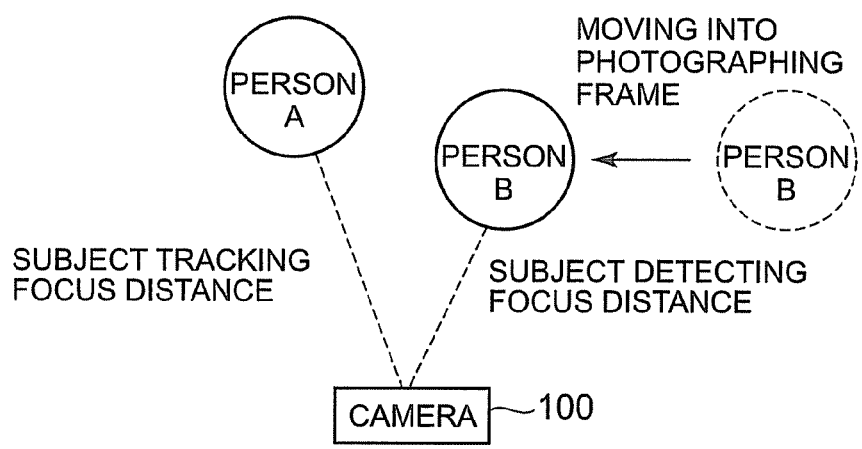
FIG. 8B is a diagram, which exemplifies to explain an example of a focus adjustment by the imaging apparatus in FIG. 1.
Figure 8C:
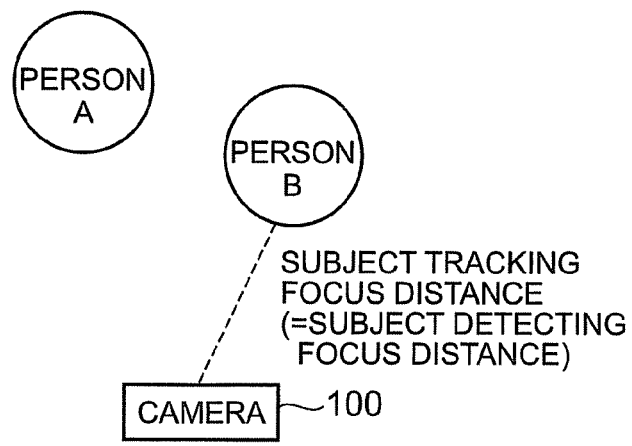
FIG. 8C is a diagram, which exemplifies to explain an example of a focus adjustment by the imaging apparatus in FIG. 1.

Here, if a person B having a priority higher than that of the person A enters the angle of view, then the autofocus (AF) operation of changing the focus distance B of the liquid lens to adjust the focus to the person B by changing the focus distance B (subject detecting focus distance) of the second management information prescribed in the focus distance table 6*b* in the state of fixing the focus distance A (subject tracking focus distance) of the liquid lens (see FIG. 8B)

Then, if the CPU 11 judges that the person B has a priority higher than that of the person A by comparing and judging the priorities of the persons A and B as a result of the individual recognition processing, then the CPU 11 switches the tracking object of the subject tracking processing to the person B, and changes the focus distance A of the first management information prescribed in the focus adjustment table 6*b* to the focus distance B of the second management information. Thereby, the CPU 11 makes the focus distance A (subject tracking focus distance) and the focus distance B (subject detecting focus distance) equal to each other (see FIG. 8C).

Incidentally, although the case where the person B, having the priority higher than that of the person A of the background, enters the angle of view in the state in which a camera is fixed has been described in this example, the case where a subject in the AF area set at the central part of the angle of view is changed by panning the camera (that is, a change from a material body to a material body, a change from a material body to a human being, a change from an unregistered human body to a registered human body, and the like, besides a change from a person to a person) is similarly fitted.

As described above, according to the imaging apparatus 100 of the present embodiment, a plurality of focus distances of the liquid lens at the time of the imaging with the imaging section 1 and the imaging control section 2 can be switched at a predetermined switching period in accordance with a plurality of pieces of management information with the voltage control section 2*a* of the imaging control section 2, and each of the switched focus distances of the liquid lens can be changed in accordance with the predetermined control conditions according to the respective uses stored in association with the management information of each of the focus distances. Thereby, the image processing of each use stored in association with the management information of the focus distances of the liquid lens at the time of imaging each image can be performed by the image processing section 5 to a plurality of images imaged with the imaging section 1 and the imaging control section 2.

That is, even if imaged images are used in, for example, the processing of a plurality of different uses of image processing, such as the subject detection processing and the subject tracking processing and the control of the focus distances of the lens for different uses is needed, the imaging apparatus 100 of the present embodiment uses the liquid lens as a controllable focus lens and changes the focus of the liquid lens on the basis of management information. Thereby, the imaging apparatus 100 can rapidly change the focus distance at the time of imaging a first image and a second image, and can perform the image processing of each use of image processing with the use of each image imaged while changing the focus distance of the liquid lens in the use. That is, a conventional focus adjusting lens is required to change the focus thereof every image frame because of a slow moving speed thereof. Consequently, when the conventional focus adjusting lens executes the sequence of focus adjustment by pressing the shutter button halfway or the like, the conventional focus adjusting lens requires an obtainment time of an image frame for the number of focus checking points. However, the use of the liquid lens enabling a rapid change of the focus distance thereof enables the performance of, for example, the subject tracking processing for tracking a predetermined subject at a predetermined subject tracking focus distance based on the first management information, and the performance of the subject detection processing for detecting a predetermined subject at a predetermined subject detecting focus distance based on the second management information on the background thereof (in parallel by time-sharing). As described above, imaging can be continued while sequentially executing the processing of a plurality of uses of the image processing of different focus distances.

Moreover, because the present embodiment changes the tracking object thereof to a new face when the priority of the individual having the new face, detected in an image frame photographed at the second focus distance of the liquid lens, is higher than that of an individual having a face under tracking as a subject, it is possible to detect another face existing at a different distance and having a higher priority by focusing on the face while focusing a face as a subject during actual tracking so as not to lose the sight thereof. Thereby, the face of a person having a higher priority among persons can be set as the tracking object.

Incidentally, the present invention is not limited to the aforesaid embodiment, but various improvements and changes of the design thereof may be performed without departing from the scope of the subject matter of the present invention.

For example, although the tracking object of the subject tracking processing is switched according to the priorities of the persons A and B registered in the priority registration table 6c in the embodiment described above, the present invention is not limited to this embodiment. If a human face is detected in an image during the tracking of a material body other than human beings as a tracking object, the newly detected face may be switched as the tracking object.

Consequently, even if a person suddenly enters a photographing frame in the state of being focused to a background material body, such as a building, the person can be detected while the background material body, such as the building, is being in focus. Thereby, the face of the person having a priority higher than that of the material body can be set a tracking object.

Incidentally, the operation of obtaining a second image, which operation is performed in the background of the image processing based on a first image, may be repeatedly performed every fixed time (in a short time) or may be performed intermittently (irregularly).

Here, if the second image is obtained every fixed time repeatedly, the image processing such as continuous focus adjustment processing and face detection processing may be executed in the background by comparing the contrast of an obtained plurality of second images. Moreover, if the obtainment of the second image is intermittently performed, the focus adjustment processing may also be executed directly by comparing the contrast between the first image and the second image without executing the continuous processing in the background.

Moreover, although the electronic imaging section 1b is made of a CMOS image sensor in the embodiment described above, the electronic imaging section 1b may be made of a CCD image sensor. In this case, the lowing of the frame rate of a display image can be prevented by performing interpolation generation of the image displayed on the display section 8 at the display timing of the second image from the first images before and after the second image.

Furthermore, although the first management information and the second management information have been exemplified as the management information in the focus adjustment table 6b in the embodiment described above, the number of pieces of management information is not limited to the above number. That is, the number of pieces of management information is arbitrary as long as the number is plural, and three or more pieces of management information may be stored.

In addition, although the embodiment described above adopts the configuration of realizing the functions of a switching section, a changing section, and an image processing section by the drives of the voltage control section 2a in the imaging control section 2 and the image processing section 5 under the control of the CPU 11, the present invention is not limited to the above configuration. The configuration of realizing the above functions by the execution of predetermined programs or the like by the CPU 11 may be adopted.

That is, a program including a switching processing routine, a changing processing routine, and an image processing routine is previously stored in a program memory (storage medium: not shown) for storing programs. Then, the CPU 11 may be configured to switch a plurality of focus distances of a lens at the time of imaging by an imaging section in a predetermined switching period in accordance with a plurality of pieces of management information by the switching processing routine. Moreover, the CPU 11 may be configured to control each of the focus distances of the lens switched by the changing section in accordance with the predetermined control conditions according to the respective uses stored in association with the managing information of each focus distance by the changing processing routine. Moreover, the CPU 11 may be conjured to perform the image processing of each use stored in association with the management information of the focus distance of the lens at the time of imaging each of a plurality of images imaged by the imaging section to the images by the image processing routine.

Moreover, although the liquid lens is used as the controllable focus lens in the embodiment described above, the controllable focus lens may be configured with the use of a solid sate lens having a refractive index to be changed by a voltage or the like.

Moreover, although the uses such as the tracking of a subject, the detecting of a subject, the displaying of a subject image, focus adjustment, and face detection have been exemplified as the uses of image processing in the embodiment described above, the uses other than those ones may be applied. Moreover, although focus control is performed in the execution of image processing in these uses, the present invention may be applied to the image processing requiring the control pertaining to the optical characteristics of a lens, such as zooming magnification ratio control, besides the focus control.

What is claimed is:

1. An imaging apparatus, comprising:
   an imaging section for changing a focus distance of a lens and performing imaging;
   a managing section for storing a plurality of pieces of management information for managing the focus distance of the lens at a time of the imaging with the imaging section correspondingly to each of a plurality of pieces of image processing for different uses, wherein the different uses includes subject tracking processing of tracking a first subject in an image photographed at a first focus distance as a tracking object and detecting processing of detecting a new subject, different from the first subject, in an image photographed at a second focus distance;
   a control section for individually controlling the focus distance of the lens managed based on each of the plurality of pieces of management information in accordance with a predetermined control condition according to image processing corresponding to each of the plurality of pieces of management information; and
   an image processing section for performing, to each of a plurality of images imaged with the imaging section, an image processing corresponding to management information used for the control of the focus distance of the lens at the time of the imaging of each of the plurality of images;
   a switching section for switching the focus distance of the lens at a predetermined switching period at the time of the imaging with the imaging section in accordance with the focus distance indicated by each of the plurality of pieces of management information while switching the plurality of pieces of management information at the predetermined switching period;

a priority storing section for storing a priority in association with each of the subjects to be the tracking object; and a changing section for changing the tracking object from the former subject to the new subject when the priority of the new subject, detected in the image photographed at the second focus distance during the tracking of the former subject, is higher than that of the former subject.

2. The imaging apparatus according to claim 1, wherein
the detecting processing is face detection processing detecting a human face in the image, and
the changing section further switches the tracking object from a subject other than the face to the face, detected in the image during the tracking of the subject as the tracking object, when the face is newly detected in the image.

3. The imaging apparatus according to claim 2, further comprising a person registering section for registering a priority in association with each person, wherein
the detecting processing is individual recognition processing of specifying an individual of the face detected in the image, and
the changing section further switches the tracking object from a face being tracked as the tracking object to a new face of a person having a priority higher than that of the face being tracked among the persons registered in the person registering section when the new face is newly detected during the tracking of the former face.

4. The imaging apparatus according to claim 1, further comprising a use setting section for setting the different uses of the plurality of pieces of image processing.

5. The imaging apparatus according to claim 1, further comprising a condition setting section for setting the predetermined control condition.

6. The imaging apparatus according to claim 1, further comprising a period setting section for setting the predetermined switching period.

7. An imaging apparatus comprising:
an imaging section for changing a focus distance of a lens and performing imaging;
a managing section for storing a plurality of pieces of management information for managing the focus distance of the lens at a time of the imaging with the imagine section;
a control section for individually controlling the focus distance of the lens managed based on each of the plurality of pieces of management information in accordance with a predetermined control condition corresponding to each of the plurality of pieces of management information;
a switching section for switching the focus distance of the lens at a predetermined switching period at the time of the imaging with the imaging section in accordance with the focus distance indicated by each of the plurality of pieces of management information while switching the plurality of pieces of management information at the predetermined switching period; and
a designating section for designating the predetermined switching period by selecting either of switching every image frame and switching every line in a predetermined direction, the line including a plurality of pixels constituting an image frame, as the predetermined switching period.

8. An imaging method of an imaging apparatus including an imaging section for repeatedly performing imaging while changing a focus distance of a lens and a managing unit for storing a plurality of pieces of management information to manage the focus distance of the lens at a time of the imaging with the imaging section correspondingly to each of a plurality of pieces of image processing for different uses, the method making the imaging apparatus execute the processes of:

individually controlling the focus distance of the lens managed based on each of the plurality of pieces of management information in accordance with a predetermined control condition according to image processing corresponding to each of the plurality of pieces of management information during a predetermined period of time when the imaging is repeatedly performed with the imaging section;

performing, to each of a plurality of images which are imaged in the imaging, image processing corresponding to a set of management information used for the control of the focus distance of the lens at the time of the imaging of each of the plurality of images during the predetermined period of time when the imaging is repeatedly performed with the imaging section; and switching the focus distance of the lens at a predetermined switching period at the time of each of the imaging in accordance with the focus distance indicated by each of the plurality of pieces of management information while repeatedly switching the plurality of pieces of management information at a predetermined switching period during the predetermined period of time when the imaging is repeatedly performed with the imaging section.

9. A non-transitory computer-readable storage medium storing a program therein for a computer of an imaging apparatus including an imaging section for repeatedly performing imaging while changing a focus distance of a lens and a managing section for storing a plurality of pieces of management information to manage the focus distance of the lens at a time of the imaging with the imaging section correspondingly to each of a plurality of pieces of image processing for different uses, the program making the computer realize the functions of:

a control section for individually controlling the focus distance of the lens managed based on each of the plurality of pieces of management information in accordance with a predetermined control condition according to image processing corresponding to each of the plurality of pieces of management information during a predetermined period of time when the imaging is repeatedly performed with the imaging section;

an image processing section for performing, to each of a plurality of images which are imaged in the imaging, image processing corresponding to a set of management information used for the control of the focus distance of the lens at the time of the imaging of each of the plurality of images during the predetermined period of time when the imaging is repeatedly performed with the imaging section; and a switching section for repeatedly switching the focus distance of the lens at a predetermined switching period at the time of each of the imaging in accordance with the focus distance indicated by each of the plurality of pieces of management information while repeatedly switching the plurality of pieces of management information at a predetermined switching period during the predetermined period of time when the imaging is repeatedly performed with the imaging section.

10. An imaging apparatus, comprising:
an imaging section for repeatedly performing imaging while changing a focus distance of a lens;
a managing section for storing a plurality of pieces of management information for managing the focus distance of the lens at a time of the imaging with the imaging section correspondingly to each of a plurality of pieces of image processing for different uses;
a control section for individually controlling the focus distance of the lens managed based on each of the plurality of pieces of management information in accordance with a predetermined control condition according to image processing corresponding to each of the plurality of pieces of management information during a predetermined period of time when the imaging is repeatedly performed with the imaging section;
an image processing section for performing, to each of a plurality of images which are imaged in the imaging, image processing corresponding to a set of management information used for the control of the focus distance of the lens at the time of the imaging of each of the plurality of images during the predetermined period of time when the imaging is repeatedly performed with the imaging section; and
a switching section for repeatedly switching the focus distance of the lens at a predetermined switching period at the time of each of the imaging in accordance with the focus distance indicated by each of the plurality of pieces of management information while repeatedly switching the plurality of pieces of management information at a predetermined switching period during the predetermined period of time when the imaging is repeatedly performed with the imaging section.

11. The imaging apparatus according to claim 10, further comprising a condition setting section for setting the predetermined control condition.

12. The imaging apparatus according to claim 10, further comprising a period setting section for setting the predetermined switching period.

* * * * *